United States Patent [19]

Totani et al.

[11] Patent Number: 5,196,507
[45] Date of Patent: Mar. 23, 1993

[54] PROCESS FOR PRODUCING GRANULES OF POLYCARBONATE AND COMPOSITION THEREOF

[75] Inventors: Yoshiyuki Totani; Masakatsu Nakatsuka; Akihiro Yamaguchi, all of Kanagawa, Japan

[73] Assignee: Mitsui Toatsu Chemicals, Inc., Tokyo, Japan

[21] Appl. No.: 822,926

[22] Filed: Jan. 21, 1992

[30] Foreign Application Priority Data

Jan. 24, 1991 [JP] Japan ................. 3-006678

[51] Int. Cl.$^5$ .............................. C08J 3/12; C08J 3/14
[52] U.S. Cl. .................................... 528/491; 528/493; 528/495; 528/497; 528/498; 528/499; 528/500; 528/502; 523/328
[58] Field of Search ............... 528/497, 498, 499, 500, 528/502, 491, 493, 495; 523/328

[56] References Cited

U.S. PATENT DOCUMENTS

| | | | |
|---|---|---|---|
| 3,213,060 | 10/1965 | Jackson, Jr. et al. | 528/493 |
| 3,214,407 | 10/1965 | Butterworth | 528/493 |
| 3,264,264 | 8/1966 | Baker | 528/497 |
| 3,505,273 | 4/1970 | Cleveland et al. | 523/328 |
| 4,423,207 | 12/1983 | Flock et al. | 528/499 |
| 4,603,194 | 7/1986 | Mendiratta et al. | 528/491 |
| 4,663,433 | 5/1987 | Pyles et al. | 528/498 |
| 4,668,768 | 5/1987 | Mendiratta et al. | 528/493 |
| 4,940,779 | 7/1990 | Ashida et al. | 528/493 |
| 4,975,525 | 12/1990 | Hostetler et al. | 528/492 |

FOREIGN PATENT DOCUMENTS

| | | |
|---|---|---|
| 36-22447 | 6/1958 | Japan . |
| 38-22497 | 6/1958 | Japan . |
| 46-31468 | 9/1971 | Japan . |
| 59-133228 | 7/1984 | Japan . |
| 60-116412 | 6/1985 | Japan . |
| 60-202126 | 10/1985 | Japan . |
| 61-250026 | 11/1986 | Japan . |
| 64-74231 | 3/1989 | Japan . |

*Primary Examiner*—Paul R. Michl
*Assistant Examiner*—Andrew E. C. Merriam
*Attorney, Agent, or Firm*—Burns, Doane, Swecker & Mathis

[57] ABSTRACT

Polycarbonate granules are produced by adding a solution of polycarbonate in an organic solvent to a suspension composed of water, an anti-solvent for polycarbonate and polycarbonate powder with stirring while evaporating and removing the organic solvent for polycarbonate added to the suspension. The procedure may be effected in the presence of a stabilizing agent for polycarbonate. The resulting polycarbonate granules are easy in handling, and free from fine powder, have high bulk density, large particle size and uniform quality, and can be directly molded.

21 Claims, No Drawings

PROCESS FOR PRODUCING GRANULES OF POLYCARBONATE AND COMPOSITION THEREOF

BACKGROUND OF THE INVENTION

1. Field of the Invention

The present invention relates to a process for producing granules of polycarbonate or a polycarbonate composition, and more particularly, to a process for the production thereof from a solution of polycarbonate or a polycarbonate composition.

2. Description of the Related Art

There have been proposed various methods for isolating polycarbonate from solution of polycarbonate.

For example, Japanese Patent Publication No. Sho 38-22497 discloses that a solution of polycarbonate in an organic solution is concentrated, crystallized and then ground. This method requires a long time for forming a crystallized state which can be ground and therefore, it is not industrially efficient.

There are known methods for precipitating polycarbonate by adding methanol (Japanese Patent Publication No. Sho 36-22447) or acetone, ethyl acetate and the like (Japanese Patent Publication No. Sho 37-7000) to a solution of polycarbonate in an organic solvent. The polycarbonate produced by the methods are of a low bulk density in the form of fine powder. There is also proposed a method for producing polycarbonate by heating a solution of polycarbonate in an organic solvent in a water medium to evaporate and remove the organic solvent (U.S. Pat. No. 3,505,273). This method gives, in general, sticky lumps so that stirring should be sufficiently effected.

Many improved methods for preventing the formation of lumps in a water medium are proposed.

For example, U.S. Pat. No. 4,423,207 discloses a method for spraying a solution of polycarbonate in an organic solvent into a warm water;

Japanese Patent Laid-open No. Sho 60-116412 discloses a method where a solution of polycarbonate in dichloromethane is fed to a particle making vessel and dichloromethane is evaporated at 1.1-50 atmospheric pressure while the suspension stated is kept in water;

Japanese Patent Laid-open No. Sho 59-133228 discloses a method comprising forming polycarbonate particles by feeding continuously a solution of polycarbonate in dichloromethane to a warm water in a particle making vessel to form polycarbonate particles, wet-grinding at least a part of the water slurry containing the polycarbonate particles, and then recirculating the product thus wet-ground to the particle making vessel;

Japanese Patent Laid-open No. Sho 60-202126 discloses a method comprising feeding a solution of polycarbonate in dichloromethane to a kneader having a grinding mechanism and reserving a hot water kept at a temperature of the boiling point of dichloromethane or higher, and kneading the polycarbonate to effect simultaneously removing the solvent and grinding;

Japanese Patent Laid-open No. Hei 1-74231 discloses a method for producing polycarbonate particles which comprises placing polycarbonate particles in a warm water, providing a narrow flow channel in the stirring flow of the warm water, applying a shearing force by rotating a stirring vane at a high speed in this flow channel to cause a high speed convection of the warm water, and feeding a solution of polycarbonate in dichloromethane to the warm water; and there are other methods.

However, any of them requires high pressure conditions, special apparatuses such as wet type grinders, kneaders and the like, and/or special conditions. Therefore, a simpler method for isolating polycarbonate from solution of polycarbonate has been demanded.

On the other hand, U.S. Pat. No. 4,668,768 discloses a method for producing polycarbonate powder which comprises adding an anti-solvent for polycarbonate such as methyl ethyl ketone, methyl isobutyl ketone and the like and water to a solution of polycarbonate in an organic solvent and then heating to evaporate and remove the organic solvent. The resulting polycarbonate powder contain, however, fine powder of polycarbonate so that flying of the fine powder occurs upon storing, bagging and molding, and further, bridging occurs in hoppers of extruding molding machine. Therefore, there are problems in handling such as flying and flowing property of the powder.

Further, as a method for producing polycarbonate having a large particle size, the following methods are known.

For example, Japanese Patent Publication No. Sho 46-31468 discloses a method for producing porous polycarbonate granules which comprises adding a lower alkyl-substituted benzene as a swelling agent for polycarbonate to a solution of polycarbonate in an organic solvent, evaporating and removing most of the organic solvent to form the gel, making the gel into granules and evaporating the organic solvent and the swelling agent;

Japanese Patent Laid-open No. Sho 61-250026 discloses a method for solidifying polycarbonate by circulating a liquid for solidifying in a wet-grinding machine in a process for adding a solvent for solidification to a solution of polycarbonate in an organic solvent followed by mixing, distilling off the organic solvent and the solvent for solidification to produce a water slurry of polycarbonate; and U.S. Pat. No. 4,603,194 discloses a method for producing polycarbonate granules which comprises adding a solution of polycarbonate in an organic solvent to water containing suspended polycarbonate particles and evaporating and removing the organic solvent.

According to the method of producing porous polycarbonate particles of Japanese Patent Publication No. Sho 46-31468, rice cake-like matters are formed in the process of solidification and said matters should be ground by stirring and therefore, much power is required and the stirring becomes often difficult.

According to the method of Japanese Patent Laid-open No. Sho 61-250026, a special particle making vessel is required which is equipped with a wet type grinding machine, and since a solvent for solidification is added to a solution of polycarbonate in an organic solvent to be fed, precipitation of polycarbonate occurs during the feeding and thereby sometimes the solution of polycarbonate in an organic solvent can not be smoothly fed.

In addition, according to the method of U.S. Pat. No. 4,603,194, polycarbonate granules substantially free from fine powder thereof can be obtained, but for purposes of obtaining polycarbonate granules having uniform particle size, the amount of polycarbonate particles, velocity of feeding the solution of polycarbonate in an organic solvent and the speed of distilling off the organic solvent should be strictly controlled, and lumps are often formed.

SUMMARY OF THE INVENTION

It is an object of the present invention to provide polycarbonate granules of excellent handling properties.

It is another object of the present invention to provide polycarbonate granules substantially free from fine powder of polycarbonate.

It is a further object of the present invention to provide polycarbonate granules of a high bulk density.

It is still another object of the present invention to provide polycarbonate granules of a large particle size.

It is a still further object of the present invention to provide polycarbonate granules having uniform quality.

It is still another object of the present invention to provide a process for producing efficiently and simply polycarbonate granules having at least partly the above-mentioned desirable characteristics.

It is a still further object of the present invention to provide polycarbonate molded articles having a good optical properties.

According to one aspect of the present invention, there is provided a process for producing polycarbonate granules which comprises adding a solution of polycarbonate in an organic solvent to a suspension composed of water, an anti-solvent for polycarbonate and polycarbonate powder with stirring while evaporating and removing the organic solvent for polycarbonate added to the suspension.

According to another aspect of the present invention, there is provided a process for producing granules of a polycarbonate composition comprising polycarbonate and at least one stabilizing agent which comprises adding a solution of polycarbonate in an organic solvent to a suspension composed of water, an anti-solvent for polycarbonate and polycarbonate powder with stirring in the presence of at least one stabilizing agent while evaporating and removing the organic solvent for polycarbonate added to the suspension.

DESCRIPTION OF THE PREFERRED EMBODIMENTS

The polycarbonates used in the present invention may be aliphatic polycarbonates and aromatic polycarbonates, preferably aromatic polycarbonates.

Aromatic polycarbonates may be produced by conventional process from dihydroxy aromatic compounds and phosgene or bischloroformates of dihydroxy aromatic compounds.

Average molecular weights of polycarbonates are not critical, but are, in usual, preferably about 1000–50000.

Dihydroxy aromatic compounds used as a starting material are, for example, those of the following formula,

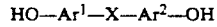

HO—Ar$^1$—X—Ar$^2$—OH where Ar$^1$ and Ar$^2$ are independently divalent monocyclic aromatic group and X is a group bonding Ar$^1$ and Ar$^2$. Ar$^1$ and Ar$^2$ may be substituted or unsubstituted phenylene. As substituents on the substituted phenylene, there are mentioned, for example, hydrocarbon groups such as alkyl, cycloalkyl, alkenyl, aryl and the like, halogen, nitro, alkoxy and the like.

It is preferable that both Ar$^1$ and Ar$^2$ are p-phenylene group, but both may be o- or m- phenylene, or one may be o- or m- phenylene and the other may be p-phenylene.

X is usually a direct bond or a divalent hydrocarbon group, and further, may be a group containing at least one atom other than carbon and hydrogen such as —O—, —S—, —SO—, —SO$_2$— and —CO—.

The divalent hydrocarbon group may be a saturated hydrocarbon group, for example, methylene, ethylene, alkylidene such as 2,2-propylidene, cyclohexylidene and the like. The divalent hydrocarbon group may be substituted with an aryl group and the like, and may be derived from aromatic groups or other unsaturated hydrocarbon groups.

Exemplary suitable dihydroxy aromatic compounds are:
bis(hydroxyaryl)alkanes such as
bis(4-hydroxyphenyl)methane,
1,1-bis(4'-hydroxyphenyl)ethane,
1,2-bis(4'-hydroxyphenyl)ethane,
bis(4-hydroxyphenyl)phenylmethane,
bis(4-hydroxyphenyl)diphenylmethane,
bis(4-hydroxyphenyl)-1-naphthylmethane,
1,1-bis(4'-hydroxyphenyl)-1-phenylethane,
2,2-bis(4'-hydroxyphenyl)propane ["Bisphenol A"],
2-(4'-hydroxyphenyl)-2-(3'-hydroxyphenyl)propane,
2,2-bis(4'-hydroxyphenyl)butane,
1,1-bis(4'-hydroxyphenyl)isobutane,
2,2-bis(4'-hydroxyphenyl)octane,
2,2-bis(3'-methyl-4'-hydroxyphenyl)propane,
2,2-bis(3'-ethyl-4'-hydroxyphenyl)propane,
2,2-bis(3'-n-propyl-4'-hydroxyphenyl)propane,
2,2-bis(3'-isopropyl-4'-hydroxyphenyl)propane,
2,2-bis(3'-sec-butyl-4'-hydroxyphenyl)propane,
2,2-bis(3'-tert-butyl-4'-hydroxyphenyl)propane,
2,2-bis(3'-cyclohexyl-4'-hydroxyphenyl)propane,
2,2-bis(3'-allyl-4'-hydroxyphenyl)propane,
2,2-bis(3'-methoxy-4'-hydroxyphenyl)propane,
2,2-bis(3',5'-dimethyl-4'-hydroxyphenyl)propane,
2,2-bis(2',3',5',6'-tetramethyl-4'-hydroxyphenyl)propane,
2,2-bis(3'-chloro-4'-hydroxyphenyl)propane,
2,2-bis(3',5'-dichloro-4'-hydroxyphenyl)propane,
2,2-bis(3'-bromo-4'-hydroxyphenyl)propane,
2,2-bis(3',5'-dibromo-4'-hydroxyphenyl)propane,
2,2-bis(2',6'-dibromo-3',5'-dimethyl-4'-hydroxyphenyl)propane,
bis(4-hydroxyphenyl)cyanomethane,
1-cyano-3,3-bis(4'-hydroxyphenyl)butane,
2,2-bis(4'-hydroxyphenyl)hexafluoropropane, and the like; bis(hydroxyaryl)cycloalkanes such as
1,1-bis(4'-hydroxyphenyl)cyclopentane,
1,1-bis(4'-hydroxyphenyl)cyclohexane,
1,1-bis(4'-hydroxyphenyl)cycloheptane,
2,2-bis(4'-hydroxyphenyl)adamantane, and the like;
dihydroxydiaryl ethers such as
4,4'-dihydroxydiphenyl ether,
4,4'-dihydroxy-3,3'-dimethyldiphenyl ether, ethylene glycol bis(4-hydroxyphenyl)ether, and the like;
dihydroxydiaryl sulfides such as
4,4'-dihydroxydiphenyl sulfide,
4,4'-dihydroxy-3,3'-dimethyldiphenyl sulfide, and the like;
dihydroxydiaryl sulfoxides such as
4,4'-dihydroxydiphenyl sulfoxide,
4,4'-dihydroxy-3,3'-dimethyldiphenyl sulfoxide, and the like;
dihydroxydiaryl sulfones such as
4,4'-dihydroxydiphenyl sulfone, 4,4'-dihydroxy-3,3'-dimethyldiphenyl sulfone, and the like;
bis(hydroxyaryl)ketones such as
bis(4-hydroxyphenyl)ketone,
bis(4-hydroxy-3-methylphenyl)ketone, and the like; and further
6,6'-dihydroxy-3,3,3',3'-tetramethylspiro(bis)indane ["spirobiindane bisphenol"],
trans-2,3-bis(4'-hydroxyphenyl)-2-butene,
9,9-bis(4'-hydroxyphenyl)fluorene,
3,3-bis(4'-hydroxyphenyl)-2-butanone,
1,6-bis(4'-hydroxyphenyl)-1,6-hexanedione,
1,1-dichloro-2,2-bis(4'-hydroxyphenyl)ethylene,
1,1-dibromo-2,2-bis(4'-hydroxyphenyl)ethylene,
1,1-dichloro-2,2-bis(5'-phenoxy-4'-hydroxyphenyl)ethylene,
α, α, α', α'-tetramethyl- α, α'-bis(4-hydroxyphenyl)-p-xylene,
α, α, α', α'-tetramethyl- α, α'-bis(4-hydroxyphenyl)-m-xylene,
4,4'-dihydroxydiphenyl,
and the like.

Other than the dihydroxy aromatic compounds, there may be similarly used hydroquinones, resorcins and the like.

These compounds may be used alone or in combination.

According to the present invention, bisphenol A is particularly preferable as the dihydroxy aromatic compound.

A solution of polycarbonate in an organic solvent used in the present invention (hereinafter abbreviated as "polycarbonate solution") may be that prepared by dissolving polycarbonate in an organic solvent.

A polycarbonate solution may be a solution of a homopolymer or copolymer of polycarbonate prepared by reacting a dihydroxy aromatic compound with phosgene or a bischloroformate of a dihydroxy aromatic compound in the presence of an organic solvent capable of dissolving polycarbonate using a small amount of a molecular weight regulator and, if desired, a branching agent according to a conventional process for producing polycarbonate, that is, an interfacial polymerization [cf. Interscience Publishing, "Encyclopedia of Polymer Science and Technology", vol.10, polycarbonate, p.710-764, (1969), H. Schnell, "Chemistry and Physics of Polycarbonate", Interscience Publishing, p.33-41, (1964)], or an appropriately concentrated solution derived therefrom.

Further, a polycarbonate solution may be that prepared by other methods.

As an organic solvent used as a solvent in the polycarbonate solution, there may be used optionally any solvent capable of dissolving polycarbonate, for example, chlorinated hydrocarbons such as dichloromethane, chloroform, 1,2-dichloroethane, 1,2-dichloroethylene and the like or mixtures thereof are preferably used.

According to the present invention, dichloromethane having a low boiling point and capable of dissolving polycarbonate very well is particularly preferable.

The concentration of polycarbonate in a polycarbonate solution may be optionally any concentration up to the saturated state. However, when the concentration is too high, the viscosity becomes too high and the handling is difficult. Therefore, in general, the concentration is preferably about 5-35 % by weight.

The anti-solvent for polycarbonate (hereinafter abbreviated as "anti-solvent") is a solvent capable of precipitating polycarbonate when added to a polycarbonate solution in an sufficient amount without removing an organic solvent.

It is different from a non-solvent which does not affect the solubility of polycarbonate even when added to a polycarbonate solution in a large amount.

Exemplary suitable anti-solvents include ketones such as acetone, methyl ethyl ketone, methyl isobutyl ketone and the like;
  esters such as ethyl acetate, butyl acetate and the like;
    aliphatic hydrocarbons such as n-hexane, n-heptane and the like;
  alicyclic hydrocarbons such as methylcyclohexane, cyclohexane and the like;
  alcohols such as methanol, isopropanol and the like; nitromethane, acetonitrile, ethylene carbonate, tetrahydrofuran, and dioxane;
  and mixtures thereof.

A feature of the present invention is to obtain substantially spherical polycarbonate granules of high bulk density and uniform particle size.

For attaining such a feature as above, a preferable anti-solvent is ketones such as acetone, methyl ethyl ketone, methyl isobutyl ketone and the like, and esters such as ethyl acetate, butyl acetate and the like.

Another feature of the present invention is that the anti-solvent is not mixed with a polycarbonate solution, but with a suspension of polycarbonate powder in water in advance.

It is known that an anti-solvent is added to a polycarbonate solution in advance and the resulting mixture is fed to warm water to produce solid polycarbonate, but according to such method, polycarbonate in the polycarbonate solution disadvantageously precipitates due to various causes such as external atmospheric temperature and the like while the polycarbonate solution is fed to a warm water or the like or is transferred, and therefore sometimes the operation does not smoothly proceed.

Further, at the initial stage of feeding a polycarbonate solution, an anti-solvent is substantially absent in the water medium such as warm water and the like, and therefore, lumps of polycarbonate are formed, and the anti-solvent in the polycarbonate solution fed successively is accumulated in the water medium due to the difference in boiling point between the anti-solvent and the organic solvent.

Finally, the anti-solvent in the water medium amounts to a prescribed amount, and as a result, polycarbonate in the organic solvent remaining in the water medium precipitates and the lumps formed at the initial stage of feeding the polycarbonate solution break in fragments.

That is, the formation of fine powder of polycarbonate can not be completely suppressed by the method of adding an anti-solvent to a polycarbonate solution in advance.

According to the process of the present invention, an anti-solvent is added to a water medium in advance so that the above-mentioned phenomenon does not occur, and polycarbonate granules substantially free from the fine powder can be produced.

In addition, adding an anti-solvent to a water medium in advance serves to disperse uniformly polycarbonate powder in water. Polycarbonate powder is an element of the present invention as stated below.

Polycarbonate powder behaves as core for producing polycarbonate granules, but if polycarbonate powder is not uniformly dispersed in a water medium, the effect is very low.

Polycarbonate is hardly compatible with water so that when polycarbonate powder is simply added to water, the powder agglomerates or is spread over the water surface. In such a state, it is not possible without an intensive stirring to keep a uniform dispersion state. However, when a prescribed amount of an anti-solvent is added to water, polycarbonate powder can be uniformly dispersed and the dispersion state can be maintained even with a very weak stirring.

The volume ratio of anti-solvent to water is preferably in the range of from 0.05:1 to 1.5:1, more preferably, in the range of from 0.1:1 to 1:1. When the ratio is less than 0.05:1, the uniformity of particle size is low and lumps are liable to form. On the contrary, when the ratio exceeds 1.5:1, the resulting polycarbonate granules have a low bulk density and are nearly fine powder.

The volume of water to be used is preferably 0.5 times or more, more preferably 0.5-3 times, the volume of the polycarbonate solution. When the volume of water is less than 0.5 times, sometimes lumps of polycarbonate are formed and stirring of the slurry becomes difficult.

When the amount relation of water and the anti-solvent is within the range as mentioned above, the amount of water relative to that of the polycarbonate solution may be large since the properties of the resulting polycarbonate granules are not adversely affected. However, using a large amount of water requires a large apparatus, the amount of the anti-solvent to be used increases, and moreover, the heat efficiency is lowered, and therefore, using a relatively large amount of water is not advantageous from an industrial point of view.

Polycarbonate powder to be dispersed in the mixture of water and an anti-solvent functions as core for producing polycarbonate granules. Particle size and particle distribution of the polycarbonate powder and the like are not critical, but the average particle size is preferably 0.1-1 mm.

As the polycarbonate powder, there may be used a part of the polycarbonate granules produced by the present invention, that is, said granules are ground and suspended in a mixture of water and an anti-solvent.

The amount of polycarbonate powder to be dispersed is preferably 0.5 % by weight or more based on the amount of polycarbonate in the polycarbonate solution, and more preferably, 0.5-50 % by weight, particularly preferably, 3-30 % by weight.

When the amount of polycarbonate powder to be dispersed is less than 0.5 % by weight, lumps of polycarbonate is liable to form and thereby it is difficult to produce polycarbonate granules having uniform characteristics. On the contrary, dispersing a large amount of polycarbonate powder does not particularly adversely affect characteristics of the resulting polycarbonate granules but it is not advantageous from a standpoint of productivity.

A polycarbonate solution may be fed to a suspension mixture of water, an anti-solvent and polycarbonate powder in various manners such as dropwise addition and the like or any other method may be used.

The feeding speed of the polycarbonate solution may be as fast as possible. The volume of an organic solvent in the polycarbonate solution is preferably 1-10 times, more preferably 1-5 times, the volume of the organic solvent evaporated and removed during feeding the polycarbonate solution.

It is usually preferable to feed the total amount of the polycarbonate solution over about 0.1-3 hours though the feeding time varies depending on the method for evaporating and removing the organic solvent, heating temperature and the like as explained below. It is clear that taking a long time for feeding is not preferable from a standpoint of productivity.

The organic solvent may be evaporated and removed by various methods. The evaporation and removal may be effected by ordinary heating. Further, the organic solvent may be evaporated and removed by heating while passing an inert gas such as nitrogen and the like, or by evaporation under reduced pressure.

A suspension mixture of water, an anti-solvent and polycarbonate powder is usually being heated while feeding a polycarbonate solution and evaporating and removing the organic solvent.

The heating temperature may be the boiling point of the organic solvent for polycarbonate or lower, but when the heating temperature is far lower than the boiling point of the organic solvent, the evaporation speed of the organic solvent is so slow that a large amount of organic solvent remains in the suspension mixture and rice cake-like matters or lumps are formed. As a result, it is difficult to obtain polycarbonate granules of uniform quality.

On the other hand, when the heating temperature is too high, the anti-solvent and water in the suspension mixture are liable to be evaporated and removed.

Therefore, according to the present invention, it is preferable that the heating temperature of the suspension mixture is the boiling point of the organic solvent for polycarbonate. It is more preferable that the heating temperature is within the range of from the boiling point of the organic solvent for polycarbonate to the boiling point of the anti-solvent and simultaneously, does not exceed the boiling point of water.

As mentioned above, when an organic solvent for polycarbonate is evaporated and removed while the polycarbonate solution is fed, with stirring, to the suspension mixture of water, the anti-solvent and polycarbonate powder, polycarbonate granules can be directly obtained without substantially forming rice cake-like matters and subjecting to grinding caused by stirring.

Therefore, it is not necessary to use a special stirring apparatus, impeller, kneader, grinder or the like, and in usual, polycarbonate granules having uniform characteristics can be quantitatively produced with ease by stirring (for example, about 100-300 rpm.) such that the dispersion state of polycarbonate powder in the suspension mixture can be kept and the organic solvent can be continuously evaporated and removed.

The polycarbonate granules produced by the process of this invention may be directly filtered off after the organic solvent has been evaporated and removed.

Further, properties of the polycarbonate granules produced by the process of this invention do not change by stirring or heating after the organic solvent has been evaporated and removed, and therefore, when the boiling point of the anti-solvent is low, the organic solvent may be first evaporated and removed and then the heating temperature may be raised to a temperature of the boiling point of the anti-solvent or higher so as to evaporate and remove it and finally the filtration may be effected.

The polycarbonate granules thus filtered can be dried by an ordinary method such as drying under vacuum, fluidizing drying and the like to make into products.

According to another aspect of the present invention, granules of a polycarbonate composition containing a stabilizing agent can be produced from a polycarbonate solution in the presence of a stabilizing agent.

It is known that color of polycarbonate is deteriorated and the molecular weight is also lowered to no small extent by pelletization of polycarbonate and heat hysteresis upon molding. Therefore, a stabilizing agent such as phosphorus-based heat resistant stabilizer, antioxidant and the like is conventionally added upon pelletization of polycarbonate.

The polycarbonate granules produced by the process of the present invention can be directly molded without subjected to a pelletizing step. This fact means that it is not necessary to use steps of once pelletizing polycarbonate obtained from a polycarbonate solution and then molding as in conventional manner and therefore, the number of times of subjecting to heat hysteresis is small and thereby degradation of molecular weight is not caused and polycarbonate of good optical properties can be produced.

The process for producing polycarbonate granules is carried out at a relatively low temperature, and therefore, the resulting polycarbonate granules are not subjected to deterioration due to heat at all. However, it is preferable to add a stabilizing agent to the process of producing polycarbonate granules when the resulting polycarbonate granules are to be directly processed to produce molded articles such as films, sheets and the like.

A stabilizing agent may be present in a suspension mixture composed of water, an anti-solvent for polycarbonate, and polycarbonate powder, or in a polycarbonate solution.

The same stabilizing agent or different stabilizing agents may be present in the suspension mixture and the polycarbonate solution.

Alternatively, in the steps of producing polycarbonate granules, a stabilizing agent may be added in the form of liquid, solid, solution or suspension, apart from the feeding of the polycarbonate solution.

In addition, there may be used a process that polycarbonate granules are produced by the present invention, filtered, and then the resulting polycarbonate granules containing partly an organic solvent or an anti-solvent are mixed with a stabilizing agent and thereby the stabilizing agent is present on the surface of polycarbonate granules followed by drying.

For example, a stabilizing agent for polycarbonate is added to a polycarbonate solution obtained by interfacial polymerization and the polycarbonate solution thus treated is used for producing granules of the polycarbonate composition, or a polycarbonate solution is added to a suspension mixture composed of water, an anti-solvent, polycarbonate powder and a stabilizing agent to produce granules of the polycarbonate composition.

As stabilizing agent for polycarbonate, there are mentioned, for example, processing and heat stabilizers such as phosphorus-based heat resistant stabilizer, antioxidant and the like, and light resistant stabilizers such as ultraviolet light absorber and the like.

Exemplary suitable stabilizers include: esters of phosphite such as
tributyl phosphite,
tris(2-ethylhexyl)phosphite,
tridecyl phosphite,
tristearyl phosphite,
triphenyl phosphite,
tricresyl phosphite,
tris(nonylphenyl)phosphite,
tris(2,4-di-t-butylphenyl)phosphite,
decyl-diphenyl phosphite,
phenyl-di-2-ethylhexyl phosphite,
phenyl-didecyl phosphite,
tricyclohexyl phosphite,
distearyl-pentaerythrityl-diphosphite,
tris(mixed mono-, di-phenyl)phosphite,
dinonylphenyl-bis(nonylphenyl)phosphite,
octyl-(2,2'-di(4,6-di-t-butylphenyl)methylene phosphite
and the like;
organic phosphines such as
triethyl phosphine,
triisopropyl phosphine,
tri-n-butyl phosphine,
tricyclohexyl phosphine,
allyl diphenyl phosphine,
triphenyl phosphine,
diphenyl phosphine,
tris(2,4-dimethylphenyl)phosphine,
tris(2,4,6-trimethylphenyl)phosphine,
tris(o-tolyl)phosphine,
tris(o-anisyl)phosphine,
diphenyl butyl phosphine,
diphenyl octadecyl phosphine,
tris-(p-nonylphenyl)phosphine,
tris(naphthyl)phosphine,
diphenyl-(hydroxymethyl)phosphine,
diphenyl-acetoxymethyl phosphine,
diphenyl-($\beta$-ethylcarboxyethyl)phosphine,
diphenyl benzyl phosphine,
diphenyl-(p-hydroxyphenyl)phosphine,
diphenyl-1,4-dihydroxyphenyl-2-phosphine,
phenyl naphthyl benzyl phosphine,
and the like;
organic phosphonites such as
triphenyl phosphonite,
dinonyl phenyl phosphonite,
diisooctyl phenyl phosphonite,
phenyl(2,4,6-trimethylphenyl)phenyl phosphonite,
[(3-ethyloxetanyl-3)-methyl]-(2,4,6-trimethylphenyl) phenyl phosphonite,
tetrakis(2,4-di-t-butylphenyl)-4,4'-biphenylene diphosphonite,
and the like;
phenol type antioxidants such as
2,6-di-t-butyl-p-cresol,
2,6-di-t-butyl-4-ethylphenol,
2,2'-methylenebis(6-t-butyl-p-cresol),
4,4'-methylenbis(6-t-butyl-o-cresol),
4,4'-methylenebis(6-t-butyl-m-cresol),
tetrakis-[methylene-3-(3',5'-di-t-butyl-4'-hydroxyphenyl) propionate]methane,
4,4'-thiobis(6-t-butyl-m-cresol),
stearyl-$\beta$-(3,5-di-t-butyl-4-hydroxyphenyl)propionate,
1,3,5-trimethyl-2,4,6-tris(3,5-di-t-butyl-4-hydroxybenzyl) benzene,
octadecyl-3-(3,5-di-t-butyl-4-hydroxyphenyl)propionate,
3,5-di-t-butyl-4-hydroxybenzyl phosphonate-diethyl ester,
and the like; and benzotriazoles such as
2-(5-methyl-2-hydroxyphenyl)benzotriazole,
2-[2-hydroxy-3,5-bis(α, α-dimethylbenzyl)phenyl]-2H-benzotriazole,
3',3'-bis[2-(5'-octyl-2'-hydroxyphenyl)benzo-triazolyl]methane,
and the like.

The stabilizing agents for polycarbonate may be used alone or in combination. The amount of the stabilizing agent is preferably the minimum amount capable of exerting the stabilizing effect. The amount varies depending upon the kind of stabilizing agents, but, in usual, preferably ranges from about 0.1 ppm to 5000 ppm.

According to the process of the present invention, there can be efficiently produced, without any special apparatus, polycarbonate particles which have at least partly the advantages, that is, the granules being free from fine powder; excellent handling for storage, bagging, transferring and molding; high bulk density (e.g. about 0.3–0.6 g/cm$^3$); and large particle size (e.g. about 1–4 mm) together with uniform quality.

In addition, the polycarbonate granules produced by the present invention can be directly molded without pelletization or any other treatment. Therefore, heat hysteresis can be reduced resulting in providing polycarbonate molded articles of good optical properties. The process of the present invention is very useful from an industrial point of view.

The following examples are given to illustrate the embodiments of the present invention. It is not intended to limit the scope of the present invention to the embodiments described.

EXAMPLE 1

25 g. of polycarbonate powder having a particle size ranging from 0.25 mm to 1 mm was dispersed in 2 liters of distilled water and 0.9 liters of acetone, and heated up to 50° C.

The 25 g. of polycarbonate powder corresponds to 5% by weight based on the polycarbonate in a polycarbonate solution to be added to the dispersion as formed above.

To the resulting dispersion was added, with stirring at about 200 rpm, a 2.5 kg solution of 20 weight precent polycarbonate having an average molecular weight of 25000 produced from bisphenol A in dichloromethane keeping the temperature at 47°–50° C. over 40 min. while evaporating and removing the dichloromethane thus added.

The resulting polycarbonate granules were filtered off and dried at 120° C. at a pressure of 30–40 mm Hg for 6 hours. Particle size and bulk density of the polycarbonate granules are shown in Table 1. There were produced substantially spherical polycarbonate granules having a uniform particle size.

EXAMPLE 2

The procedure of Example 1 was repeated except that 150 g. of the polycarbonate powder (30% by weight based on the polycarbonate in a polycarbonate solution to be added to the resulting dispersion) was used in place of 25 g. of the polycarbonate powder, and polycarbonate granules were produced.

Particle size and bulk density of the polycarbonate granules are shown in Table 1. There were produced substantially spherical polycarbonate granules having a uniform particle size.

EXAMPLE 3

The procedure of Example 1 was repeated except methyl ethyl ketone was used in place of acetone, and polycarbonate granules were produced.

Particle size and bulk density of the resulting polycarbonate granules are shown in Table 1. There were produced substantially spherical polycarbonate granules having a uniform particle size.

EXAMPLE 4

The procedure of Example 1 was repeated except that ethyl acetate was used in place of acetone, and polycarbonate granules were produced.

Particle size and bulk density of the polycarbonate granules are shown in Table 1. There were produced substantially spherical polycarbonate granules having a uniform particle size.

COMPARATIVE EXAMPLE 1

For comparison, an anti-solvent was added to a polycarbonate solution to produce polycarbonate.

That is, 25 g. of polycarbonate powder having a particle size ranging from 0.25 mm to 1 mm was dispersed in 2 liters of distilled water and heated up to 50° C.

To the resulting dispersion kept at a temperature of 47–50° C. was added over 40 min. a polycarbonate solution prepared by adding 0.9 liters of acetone to a 2.5 kg solution of 20 weight percent polycarbonate having an average molecular weight of 25000 produced from bisphenol A in dichloromethane while evaporating and removing the dichloromethane thus added.

The resulting polycarbonate was a mixture of lump-like matters and fine powder, and the particle sizes were not uniform. The lump-like matters had a diameter of about 30 mm and therefore, were very unsuitable for pelletization and molding.

COMPARATIVE EXAMPLE 2

Polycarbonate particles were produced without adding polycarbonate powder. That is, 0.9 liters of acetone was added to 2 liters of distilled water and heated to 50° C. To the resulting mixture solution was added over 40 min. a 2.5 kg solution of 20 weight percent polycarbonate having an average molecular weight of 25000 produced from bisphenol A in dichloromethane while evaporating and removing the dichloromethane.

The resulting polycarbonate was composed of particles having non-uniform particle sizes and contained much fine powder. Furthermore, handling of the polycarbonate was not easy since the fine powder was liable to fly.

COMPARATIVE EXAMPLE 3

Following the procedure of U.S. Pat. No. 4,668,768, a mixture of a polycarbonate solution, water and an anti-solvent for polycarbonate was heated in place of feeding a polycarbonate solution and an organic solvent was vaporized and removed to produce polycarbonate powder.

That is, 2 liters of distilled water and 0.9 liters of acetone were added to a 2.5 kg solution of 20 weight percent polycarbonate having an average molecular weight of 25000 produced from bisphenol A in dichloromethane. The resulting mixture was heated to 50° C. to evaporate and remove dichloromethane from the mixture.

During distilling off the dichloromethane as above, gelation of polycarbonate occurred and in the process of breaking gel the solvent in the gel suddenly distilled in a large amount. It was dangerous in operation.

The resulting polycarbonate contained a large amount of fine powder and the particle size was not uniform.

COMPARATIVE EXAMPLE 4

The procedure of Example 1 was repeated except that 1.5 g. of the polycarbonate powder (corresponding to 0.3% by weight based on the polycarbonate in a polycarbonate solution to be added to the dispersion) was used in place of 25 g. of the polycarbonate powder, and polycarbonate granules were produced.

The resulting polycarbonate granules contained lump-like matters and fine powder, and therefore, the polycarbonate granules were not suitable for molding.

COMPARATIVE EXAMPLE 5

The procedure of Example 1 was repeated except that 4 liters of acetone was used in place of 0.9 liters of acetone, and polycarbonate particles were produced.

The resulting polycarbonate had a very low bulk density.

COMPARATIVE EXAMPLE 6

For comparison, polycarbonate granules were produced without adding an anti-solvent. That is, 25 g. of polycarbonate powder having a particle size of 0.25-1 mm was dispersed in 2 liters of distilled water and heated to 50° C. To the resulting suspension kept at 47-50° C. was added over 40 min. a 2.5 kg solution of 20 weight percent polycarbonate having an average molecular weight of 25000 prepared from bisphenol A in dichloromethane while evaporating and removing dichloromethane.

The resulting polycarbonate was free from fine powder, but most particle sizes were about 10 mm and particle sizes were not uniform. Moreover, the shapes of granules were widely different from one another. The granules were not suitable for pelletization and molding.

EXAMPLE 5

The procedure of Example 1 was repeated except that dinonylphenyl-bis(nonylphenyl)phosphite was added as a stabilizing agent to the polycarbonate solution in an amount of 150 ppm in advance, and granules of the polycarbonate composition were produced.

Particle size and bulk density of the granules of the polycarbonate composition are shown in Table 1. There were produced substantially spherical granules of polycarbonate composition having a uniform particle size.

EXAMPLE 6

The procedure of Example 1 was repeated except that dinonyl phenyl-bis(nonylphenyl)phosphite was added as a stabilizing agent to the suspension mixture of water and polycarbonate powder in an amount of 150 ppm, and particles of polycarbonate composition were produced.

Particle size and bulk density of the particles of polycarbonate composition are shown in Table 1. There were produced substantially spherical granules of polycarbonate composition having a uniform particle size.

APPLICATIVE EXAMPLE 1

Polycarbonate granules obtained in Example 1 were dried and molded at 280° C. by using an injection molding machine (PS-20E2ASE, trade name, manufactured by Nissei Jushi Kogyo K.K.) to prepare a test piece of 2 mm thick and 80×40 mm.

The degree of yellowness (YI value) was measured according to a transmission measurement by means of a color-difference meter (CDE-SCH-3, trade name, manufactured by Suga Shikenki). The YI value was 4.3.

APPLICATIVE EXAMPLE 2

The procedure of Applicative Example 1 was repeated except that the granules of polycarbonate composition obtained in Example 5 were used in place of the granules of polycarbonate composition obtained in Example 1, and a test piece of 2 mm thick and 80×40 mm was prepared.

The degree of yellowness (YI value) was measured according to a transmission measurement by means of the color-difference meter manufactured by Suga Shikenki. The YI value was as good as 3.1.

APPLICATIVE EXAMPLE 3

The procedure of Applicative Example 1 was repeated except that the granules of polycarbonate composition obtained in Example 6 were used in place of the granules of polycarbonate composition obtained in Example 1, and a test piece of 2 mm thick and 80×40 mm was prepared.

The degree of yellowness (YI value) was measured according to a transmission measurement by means of the color-difference meter manufactured by Suga Shikenki. The YI value was as good as 3.1.

APPLICATIVE EXAMPLE 4

To the polycarbonate obtained in Comparative Example 2 was added dinonyl-bis(nonylphenyl)phosphite as a stabilizing agent in an amount of 150 ppm, dried, then screened to collect particles of a particle size ranging from 0.25-1 mm, and pelletized by means of a 20 mm φ extruder (twin-screw extruder, manufactured by Toyo Seiki K.K., the extruding temperature being 270° C.).

The polycarbonate thus pelletized was molded, in a manner similar to Applicative Example 1, at 280° C. by using an injection molding machine (PS-20E2ASE, trade name, manufactured by Nissei Jushi Kogyo K.K.) to produce a test piece of 2 mm thick and 80×40 mm.

The degree of yellowness (YI value) was measured according to a transmission measurement by means of the color-difference meter manufactured by Suga Shikenki. The YI value was 6.9.

TABLE 1

| | Particle Size Distribution [% by weight] | | | | | | | Bulk Density ($g/cm^3$) |
|---|---|---|---|---|---|---|---|---|
| | 0~ | 0.125 mm~ | 0.25 mm~ | 0.5 mm~ | 1 mm~ | 2 mm~ | 4 mm or more | |
| Example 1 | 0 | 0 | 0 | 0 | 6 | 94 | 0 | 0.58 |
| Example 2 | 0 | 0 | 0 | 35 | 47 | 18 | 0 | 0.58 |
| Example 3 | 0 | 0 | 0 | 0 | 45 | 55 | 0 | 0.55 |
| Example 4 | 0 | 0 | 0 | 0 | 20 | 80 | 0 | 0.45 |

TABLE 1-continued

| | Particle Size Distribution [% by weight] | | | | | | | Bulk Density (g/cm³) |
|---|---|---|---|---|---|---|---|---|
| | 0~ | 0.125 mm~ | 0.25 mm~ | 0.5 mm~ | 1 mm~ | 2 mm~ | 4 mm or more | |
| Example 5 | 0 | 0 | 0 | 0 | 11 | 89 | 0 | 0.58 |
| Example 6 | 0 | 0 | 0 | 0 | 7 | 93 | 0 | 0.58 |
| Comparative Example 1 | 5 | 8 | 7 | 2 | 5 | 14 | 59 | 0.50 |
| Comparative Example 2 | 10 | 13 | 17 | 16 | 15 | 17 | 12 | 0.52 |
| Comparative Example 3 | 5 | 15 | 17 | 23 | 22 | 6 | 12 | 0.57 |
| Comparative Example 4 | 1 | 0 | 0 | 1 | 12 | 57 | 29 | 0.45 |
| Comparative Example 5 | 1 | 3 | 10 | 47 | 34 | 3 | 2 | 0.25 |
| Comparative Example 6 | 0 | 0 | 0 | 0 | 0 | 10 | 90 | 0.42 |

What is claimed is:

1. A process for producing polycarbonate granules which comprises adding a solution of polycarbonate in an organic solvent to a suspension composed of water, an anti-solvent for polycarbonate and polycarbonate powder with stirring while evaporating and removing the organic solvent for polycarbonate added to the suspension.

2. The process according to claim 1 in which the volume ratio of the anti-solvent for polycarbonate to water in the suspension ranges from 0.05:1 to 1.5:1.

3. The process according to claim 1 in which the amount of the polycarbonate powder in the suspension is 0.5-50 % by weight based on the amount of the polycarbonate in the organic solvent solution.

4. The process according to claim 1 in which the organic solvent for polycarbonate is evaporated and removed at a temperature of the boiling point of the organic solvent or higher.

5. The process according to claim 1 in which the organic solvent for polycarbonate is evaporated and removed at a temperature ranging from the boiling point of the organic solvent of polycarbonate to the boiling point of the anti-solvent for polycarbonate and not exceeding the boiling point of water.

6. The process according to claim 1 in which the volume ratio of the anti-solvent for polycarbonate to water in the suspension ranges from 0.05:1 to 1.5:1 and the amount of the polycarbonate powder in the suspension is 0.5-50 % by weight based on the amount of the polycarbonate in the organic solvent solution.

7. The process according to claim 1 in which the volume ratio of the anti-solvent for polycarbonate to water in the suspension ranges from 0.05:1 to 1.5:1, the amount of the polycarbonate powder in the suspension is 0.5-50 % by weight based on the amount of the polycarbonate in the organic solvent solution, and the organic solvent for polycarbonate is evaporated and removed at a temperature ranging from the boiling point of the organic solvent for polycarbonate to the boiling point of the anti-solvent for polycarbonate and not exceeding the boiling point of water.

8. A process for producing granules of a polycarbonate composition comprising polycarbonate and at least one stabilizing agent which comprises adding a solution of polycarbonate in an organic solvent to a suspension composed of water, an anti-solvent for polycarbonate and polycarbonate powder with stirring in the presence of at least one stabilizing agent while evaporating and removing the organic solvent for polycarbonate added to the suspension.

9. The process according to claim 8 in which the volume ratio of the anti-solvent for polycarbonate to water in the suspension ranges from 0.05:1 to 1.5:1.

10. The process according to claim 8 in which the amount of the polycarbonate powder in the suspension is 0.5-50% by weight based on the amount of the polycarbonate in the organic solvent solution.

11. The process according to claim 8 in which the organic solvent for polycarbonate is evaporated and removed at a temperature of the boiling point of the organic solvent or higher.

12. The process according to claim 8 in which the organic solvent for polycarbonate is evaporated and removed at a temperature ranging from the boiling point of the organic solvent of polycarbonate to the boiling point of the anti-solvent for polycarbonate and not exceeding the boiling point of water.

13. The process according to claim 8 in which the volume ratio of the anti-solvent for polycarbonate to water in the suspension ranges from 0.05:1 to 1.5:1 and the amount of the polycarbonate powder in the suspension is 0.5-50% by weight based on the amount of the polycarbonate in the organic solvent solution.

14. The process according to claim 8 in which the volume ratio of the anti-solvent for polycarbonate to water in the suspension ranges from 0.05:1 to 1.5:1, the amount of the polycarbonate powder in the suspension is 0.5-50% by weight based on the amount of the polycarbonate in the organic solvent solution, and the organic solvent for polycarbonate is evaporated and removed at a temperature ranging from the boiling point of the organic solvent for polycarbonate to the boiling point of the anti-solvent for polycarbonate and not exceeding the boiling point of water.

15. The process according to claim 8 in which the stabilizing agent is present in the suspension in advance.

16. The process according to claim 8 in which the stabilizing agent is present in the solution of polycarbonate in an organic solvent.

17. The process according to claim 8 in which at least one stabilizing agent is present in the suspension in advance and at least one stabilizing agent which is the same as or different from the above-mentioned stabilizing agent is present in the solution of polycarbonate in an organic solvent.

18. The process according to claim 8 in which the stabilizing agent is supplied in the form of liquid, solid, solution or suspension during the step of forming particles of a polycarbonate composition.

19. The process according to claim 8 in which the volume ratio of the anti-solvent for polycarbonate to water in the suspension ranges from 0.05:1 to 1.5:1, the amount of the polycarbonate powder in the suspension is 0.5-50% by weight based on the amount of the polycarbonate in the organic solvent solution, the organic solvent for polycarbonate is evaporated and removed at a temperature ranging from the boiling point of the organic solvent for polycarbonate to the boiling point of the anti-solvent for polycarbonate and not exceeding the boiling point of water, and the stabilizing agent is present in the suspension in advance.

20. The process according to claim 8 in which the volume ratio of the anti-solvent for polycarbonate to water in the suspension ranges from 0.05:1 to 1.5:1, the amount of the polycarbonate powder in the suspension is 0.5-50% by weight based on the amount of the polycarbonate in the organic solvent solution, the organic solvent for polycarbonate is evaporated and removed at a temperature ranging from the boiling point of the organic solvent for polycarbonate to the boiling point of the anti-solvent for polycarbonate and not exceeding the boiling point of water, and the stabilizer is present in the solution of polycarbonate in an organic solvent in advance.

21. The process according to claim 8 in which the volume ratio of the anti-solvent for polycarbonate to water in the suspension ranges from 0.05:1 to 1.5:1, the amount of the polycarbonate powder in the suspension is 0.5-50% by weight based on the amount of the polycarbonate in the organic solvent solution, the organic solvent for polycarbonate is evaporated and removed at a temperature ranging from the boiling point of the organic solvent for polycarbonate to the boiling point of the anti-solvent for polycarbonate and not exceeding the boiling point of water, and at least one stabilizing agent is present in the suspension in advance and at least one stabilizing agent which is the same as or different from the above-mentioned stabilizing agent is present in the solution of polycarbonate in an organic solvent.

* * * * *